J. S. WILCOX, dec'd.

D. B. GREENE, administrator, assignor by mesne assignments, to L. M. & M. RUMSEY.

Chain-Pump Bucket.

No. 8,370. Reissued Aug. 13, 1878.

ATTEST:

Saml. Knight

John T. Schnetle

ASSIGNEES

Lewis M. Rumsey

Moses Rumsey

N. PETERS, PHOTO-LITHOGRAPHER, WASHINGTON, D. C.

UNITED STATES PATENT OFFICE.

LEWIS M. RUMSEY AND MOSES RUMSEY, OF ST. LOUIS, MISSOURI, ASSIGNEES, BY MESNE ASSIGNMENTS, OF DANIEL B. GREENE, ADMINISTRATOR OF JOSEPH S. WILCOX, DECEASED.

IMPROVEMENT IN CHAIN-PUMP BUCKETS.

Specification forming part of Letters Patent No. 119,679, dated October 3, 1871; Reissue No. 8,370, dated August 13, 1878; application filed June 5, 1878.

*To all whom it may concern:*

Be it known that JOSEPH S. WILCOX, deceased, late of Ypsilanti, in the county of Washtenaw and State of Michigan, did invent a new and useful Improvement in Buckets for Chain-Pumps, of which the following is a full, clear, and exact description, reference being had to the accompanying drawings, forming part of this specification.

Figure 1:
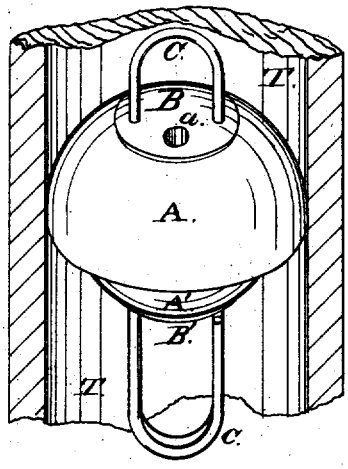
Figure 2:
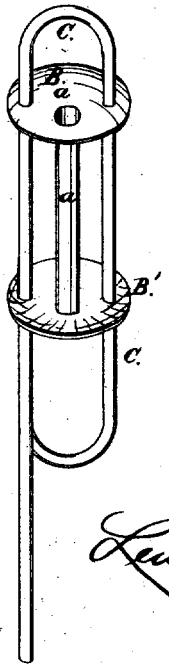

Figure 1 is a perspective view of the improved chain-pump bucket with the pump-tube in section. Fig. 2 is a perspective view of the metallic parts, the rubber blocks being removed and one of the rods from which the link is formed extended as before bending.

The figures represent the bucket in ascending position.

This improvement relates to that class of buckets for chain-pumps in which the bucket is formed of rubber or other elastic material.

The first part of the improvement consists in forming the bucket in two sections; also, the combination, with the two sections, of a metallic frame with loops and bearing at top and bottom of the bucket; also, the bucket having an incompressible tube to allow the escape of water from above the bucket when the pump is at rest.

The drawings show the preferred form of the bucket, each block or section being made in the segment of a sphere, and the lower section or hemisphere of smaller diameter than the upper one, so that, while the upper section fills the tube, the lower section, when the bucket is ascending, will press against and force out the lower edge of the upper section against the tube, and thus the upper section will be held in contact with the tube, notwithstanding the column of water pressing upon the outside (of the upper section) tends to collapse it, for it will be seen that the pressure of the lower section beneath the upper will increase with the increase of the column of water above the bucket.

A represents the larger member of the bucket, consisting of elastic rubber or other similar material. The smaller member of the bucket is shown at A′. They are in the form of segments of spheres in contact at their base. The larger one is uppermost in ascending the water-tube T.

B B′ are two plates. The former is placed on the apex of the member A of the bucket and the latter under the bottom, and they are connected by a tube, *a*, extending through both, passing, of course, through the bucket. The ends of the tube are soldered or otherwise attached to the plates.

C is the link, made in the shape of a long staple, and it passes through proper holes in the top plate, B, and also through the parts A and A′ and through suitable holes in the bottom plate, B′, beneath which its ends are bent up to form a link or loop. The link may be firmly soldered to the plates where it passes through them.

We are aware of the pump-bucket patented June 20, 1871, by William C. Barker, in which a drip-hole is made through the rubber hemisphere which forms his bucket, which drip-hole is inoperative, for the reason that the rubber is compressed the moment it enters the pump-tube, and this drip-hole is thereby closed until the bucket passes out of the tube, whereby the water which is in the tube when the pump is stopped remains there, acquiring the flavor of the wood, and is liable to freeze in cold weather. These objections are fully overcome by employing the metallic tube *a*, running through the bucket, which cannot collapse it, and insuring at all times a quick discharge of the water from the tubing.

It frequently happens that the pawl does not engage with the ratchet on the wheel-shaft when ceasing to pump, in which case the buckets are apt to be torn off the links by the weight of the column of water reversing suddenly the motion of the chain. This cannot happen under such circumstances with this improved bucket, as the upper plate fully supports the rubber. The form of the bucket is such that the periphery is expanded with more certainty against the walls of the tube than if the bucket were a plain hemisphere.

The advantage of making the lower as well as the upper disk hemispherical is obvious. When a flat disk of smaller diameter is used underneath, which we are aware is old, the pressure of the link as the bucket is drawn upward through the tube is in the center of the same, and has a tendency to draw the edge or periphery away from the tube or in a downward direction, and thus the water is allowed to escape beneath it, since the edge of the upper disk is not expanded and forced against the tube. By making the lower disk hemispherical, however, its thickest portion being at the center or draft-line and its thinnest portion at its periphery, it is expanded tightly against the circumference of the tube, and thus retains all the water above it and entirely prevents leakage.

We claim herein as the invention of JOSEPH S. WILCOX aforesaid—

1. A chain-pump bucket constructed of two elastic hemispheres, having their flat sides in contact, substantially in the manner and for the purpose specified.

2. A chain-pump bucket composed of an elastic member, A, and member A′, expanding the former by pressure beneath it.

3. In chain-pumps, a bucket composed of two elastic segments of spheres, A and A′, the former, A, being larger than the other, A′, and constructed substantially in the manner and for the purpose specified.

4. In combination with a rubber bucket, an incompressible tube, for the purpose set forth.

5. The combination of the plates B B′, tube *a*, and link C with an elastic bucket, for the purpose set forth.

LEWIS M. RUMSEY.
MOSES RUMSEY.

Witnesses:
SAML. KNIGHT,
JOHN D. SCHNELLE.